Figure 1:
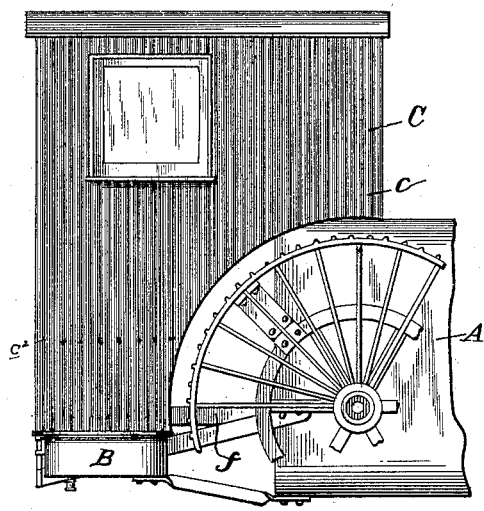

No. 663,147. Patented Dec. 4, 1900.
G. F. CONNER.
CAB FOR TRACTION ENGINES.
(Application filed Mar. 1, 1900.)

(No Model.)

Witnesses

Inventor
George F. Conner
By Sheldon A. Wood
Attorney

UNITED STATES PATENT OFFICE.

GEORGE F. CONNER, OF PORT HURON, MICHIGAN.

CAB FOR TRACTION-ENGINES.

SPECIFICATION forming part of Letters Patent No. 663,147, dated December 4, 1900.

Application filed March 1, 1900. Serial No. 6,970. (No model.)

*To all whom it may concern:*

Be it known that I, GEORGE F. CONNER, a citizen of the United States, residing at Port Huron, in the county of St. Clair and State of Michigan, have invented certain new and useful Improvements in Cabs for Traction-Engines, of which the following is a specification.

This invention relates to cabs for traction-engines; and it consists, primarily, of a "cab," so called, which may be formed of light metal or other suitable material.

It also consists in the particular construction of the floor of the cab and in other features which will be presently described.

In the drawings I have shown the invention as applied to a well-known type of traction-engine, the latter being shown largely in outline.

Figure 2:
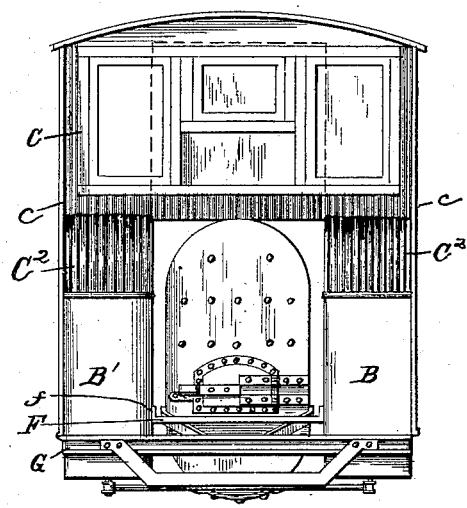
Figure 3:
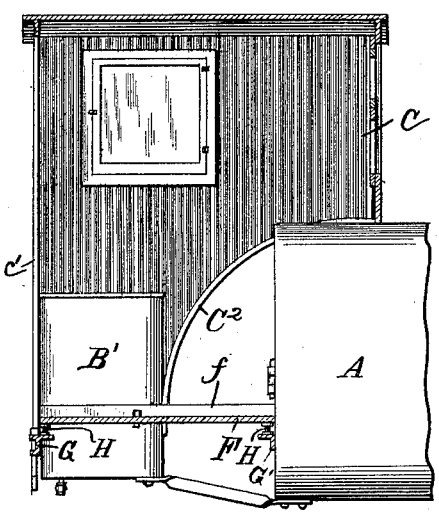
Figure 4:
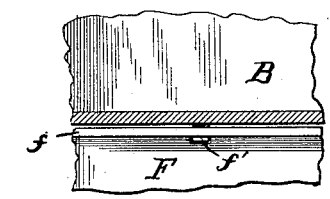
Figure 5:
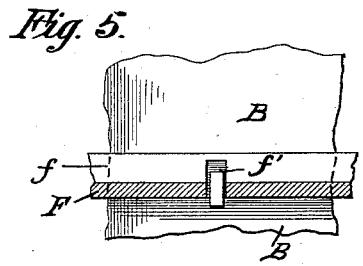
Figure 6:
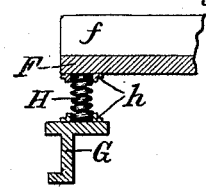

In the drawings, Figure 1 represents a side elevation. Fig. 2 is a rear view showing the rear plates of the cab in dotted lines. Fig. 3 is a longitudinal section, and Figs. 4, 5, and 6 are detail views.

In the drawings, A represents an engine proper, and B and B' water-tanks which, as usual, are carried by the rear bolsters and located in the back of the traction-wheels. These tanks extend upwardly and are on opposite sides of the fire-box and are rigidly held in place in a well-known manner.

C designates a cab proper, which is formed, preferably, of corrugated galvanized iron, the same comprising the sides $c$, the two end plates $c'$, and a suitably-glazed front. The sides of the cab are curved, as shown, to conform to the contour of the wheels, and the metal plates are bolted at the lower ends directly to the tank or to a flange thereof, as the case may be, while their upper portions are bolted, as at $c^2$, to the upper portions of the tanks and carry the front plates.

$C^2$ represents the guard-plates for the wheels, extending from the front faces of the tanks upward to the front of the cab, which front may be, if desired, supported directly on the engine.

The cab is provided with a suitable top of any convenient material.

It is believed that the application of metal plates directly to the tank of a traction-engine to serve as a cab or protector is new.

It is recognized that in traction-engines there is always more or less jolt, and to provide against the transmission of this movement to the operator or engineer a suitable floor F is provided for the cab. This floor has side flanges $f$, fitting closely against the sides of the water-tanks, and is mounted in suitable ways, as at $f'$, to prevent backward movement. Below the floor, supported by the end bolsters G and the supporting-frame G', are a series of spiral springs H, suitably held in place by the pins or sockets $h$ or by any other desired means. By this means a yielding platform is provided, which in a large degree absorbs the constant vibration of the engine when in motion.

The details of the construction above may be vastly changed without departing from the nature and principle of the invention.

Having thus described my invention, what I claim as new, and desire to secure by Letters Patent, is—

In a traction-engine or the like, the combination with the engine and water-tanks in rear thereof arranged substantially as described, of a cab supported around the tanks comprising the side plates C secured directly to the outer faces of the tanks, a top and front connected to said sides, and curved protecting-plates $C^2$ arranged substantially as and for the purpose set forth.

In testimony whereof I affix my signature in presence of two witnesses.

GEORGE F. CONNER.

Witnesses:
S. A. WOOD,
H. B. HOYT.